Dec. 29, 1964 J. K. WILLIAMS 3,163,471
APPARATUS FOR DELIVERING COTTON BOLLS OR
LIKE MATERIAL AND BREAKING TRASH
MIXED THEREWITH
Filed Dec. 31, 1962
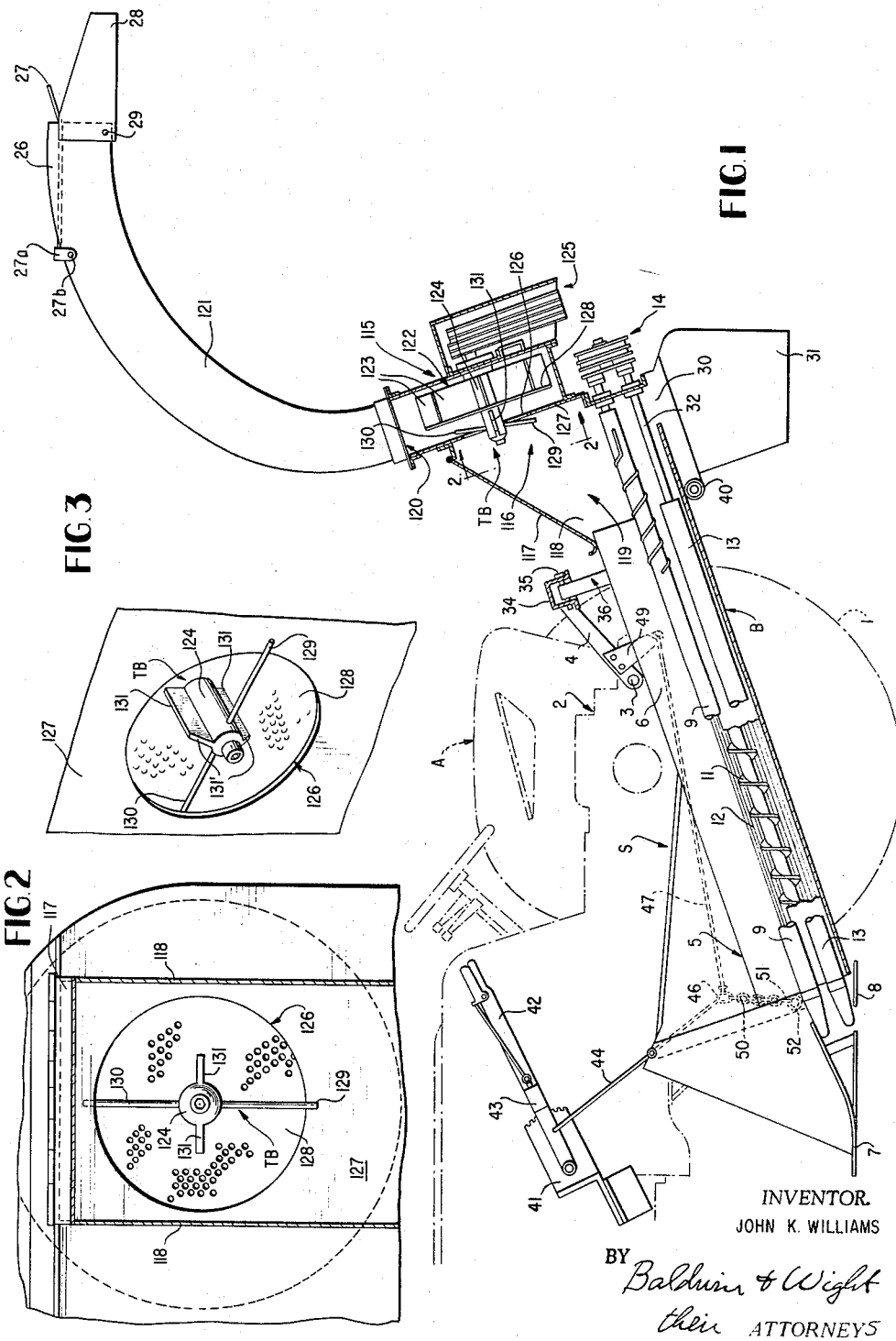
INVENTOR.
JOHN K. WILLIAMS
BY Baldwin & Wight
their ATTORNEYS

United States Patent Office 3,163,471
Patented Dec. 29, 1964

3,163,471
APPARATUS FOR DELIVERING COTTON BOLLS OR LIKE MATERIAL AND BREAKING TRASH MIXED THEREWITH
John K. Williams, Waco, Tex., assignor to Central Texas Iron Works, Waco, Tex., a corporation of Texas
Filed Dec. 31, 1962, Ser. No. 248,652
10 Claims. (Cl. 302—37)

This invention relates to apparatus for delivering cotton bolls or like material and for breaking trash, such as plant stalks, mixed therewith. More particularly, the invention relates to such material delivering and breaking apparatus as may be associated with cotton harvesters.

In the co-pending application of Malcolm Allan Horton and John K. Williams, Serial No. 126,203, filed July 24, 1961 now Patent No. 3,123,963, granted March 10, 1964, owned in common with the present application, there is disclosed and claimed a cotton harvester particularly suited for harvesting cotton from standing stalks, including an improved construction for suspending the harvester mechanism from a main frame, and related constructural improvements including apparatus for delivering cotton bolls or like material and breaking trash mixed therewith.

In the co-pending application of Malcolm Allan Horton and John K. Williams, Serial No. 248,651, filed concurrently herewith, and also owned in common with the present application, there is disclosed and claimed apparatus for delivering cotton bolls or like material and breaking trash mixed therewith. The material delivering and trash breaking apparatus disclosed and claimed in the co-pending divisional application is characterized generally by stalk breaking means in the nature of radial arms or rods spanning an air induction passage through which a mixture of cotton bolls or like primary material and trash is air borne, the arms or rods breaking the trash before it leaves the induction passage.

An object of the present invention is to provide material delivering and trash breaking apparatus of the general nature of and having the desirable attributes of the apparatus claimed in the co-pending application Serial No. 248,651, but embodying structural improvements providing for even more efficient operation.

Other objects of the invention will become apparent from a reading of the following description, the appended claims, and the accompanying drawings, in which:

FIGURE 1 is a fragmentary view, partly in side elevation and partly in vertical section, of a cotton harvester equipped with apparatus embodying the invention;

FIGURE 2 is a fragmentary transverse sectional view on the line 2—2 of FIGURE 1, on an enlarged scale and showing a trash breaker and blower screen in elevation;

FIGURE 3 is a perspective view of trash breaker mechanism according to the invention.

Only so much of the harvester disclosed in application Serial No. 126,203 as will assist in understanding one of the possible uses or environments of the invention will be described in connection with a more detailed description of the material delivering and trash breaking apparatus which is claimed in this application. A preferred form of the harvester is shown as being embodied in a cotton harvester structure which, in an overall sense, includes a mobile main frame A supported on and for movement over the ground, as along rows of growing or standing cotton, and two harvester units, one of which is shown at B, suspended from the main frame and extending alongside the latter on opposite sides thereof. The suspension means, generally designated S, is so constructed and correlated with main frame A and harvester units as to provide in effect a three point suspension having considerable flexibility for enabling the harvester units to be adjusted, and, in fact, to adjust or adapt themselves automatically to the usual relatively small deviations of the plant rows from straight lines, the suspension means being also well adapted for enabling adjustment of the mechanism units vertically to suit the slope or nature of the ground.

In the illustrative embodiment, the main frame A is constituted by the frame of a motorized tractor equipped with power driven rear ground wheels, one of which is shown at 1 in FIGURE 1, the two ground wheels being positioned to straddle two adjacent rows of cotton plants. As is well known with respect to standard forms of tractors of this kind, a steerable front wheel or front wheel assembly, not shown, is positioned in advance of the ground wheels 1 and between the latter so as to run down between the two adjacent rows spanned by the ground wheels 1.

The tractor further includes a power lift mechanism, generally designated 2, adapted to be driven in a known manner by the main tractor engine, not shown. The power lift mechanism 2 includes a power operated shaft 3 which projects transversely of the tractor frame to opposite sides of the longitudinal center line of the tractor and is provided adjacent its opposite ends with power lift arms, one of which is shown at 4.

The two harvester units are similar in construction except as to one being of the right hand sense and the other of the left hand sense, so that the illustration and description of the unit B will suffice for both. As shown in FIGURE 1, the unit B comprises a mechanism frame and housing 5 having side walls 6 separated longitudinally at the center of the unit to provide a plant receiving slot extending through the unit from front to rear and parallel to the direction of movement of the harvester over the ground. On the opposite sides of the central slot and at the front of the frame 5 are laterally spaced guide or pick-up fingers 7, one of which is shown in FIGURE 1. As the harvester moves down the plant rows, the stalks are received between the pick-up fingers 7 and are guided into the slot midway between the housing side walls. The fingers 7 and runners 8 at the front of the mechanism frame 5 may engage the ground so as to limit downward movement of the front ends of the harvester units, although the suspension structure S also determines the elevation of the unit B, especially when the harvester is being moved from place-to-place without harvesting. The pick-up fingers and their relation to the slotted housing structures are generally similar to those of a number of known cotton harvester equipments, for example of the kind shown in Patent No. 2,306,058, granted August 20, 1946, to Claude T. Boone.

Within the housing or frame 5 of the unit B and extending longitudinally of the unit is a pair of stripper rolls, one of which is shown at 9, spaced from each other and disposed respectively on opposite sides of the central longitudinal vertical plane or slot of the mechanism frame 5. In operation, the rolls 9 are rotated oppositely to one another, the contiguous surfaces of the rolls moving upwardly, with the result that cotton bolls are stripped from stalks extending upwardly between the rolls 9. The stripped bolls are tossed upwardly and outwardly by the rolls 9 so as to drop at opposite sides of the frame 5 for being picked up by screw conveyors or augers, one of which is shown at 11, which move the bolls to the rear of the unit for being picked up and discharged by mechanism to be described later. Unavoidably, some "trash," including for example rocks, hard lumps of earth and other foreign matter, will find its way into the conveyor troughs. In order to prevent the trash from being delivered to the boll discharging mechanism, or to minimize such delivery, the conveyor troughs are formed at their bottoms and outer sides with spaced longitudinally extending slats 12 between which the trash, or most of it, may drop back to the ground.

Some stalks which are not very well rooted, may be pulled out of the ground by the harvesting mechanism. In order to prevent pulled-out stalks from being carried back to the boll delivering mechanism, a pair of ejector rolls, one of which is shown at 13, is mounted below the stripper rolls 9. The ejector rolls 13 are positioned similarly to the stripper rolls 9, that is, respectively on opposite sides of the stalk receiving slot; but the ejector rolls are of larger diameter than the stripper rolls, the clearance between the ejector rolls being less than the clearance between the stripper rolls. The ejector rolls are rotated oppositely to one another, the contiguous surfaces of the rolls 13 moving downwardly, with the result that stems or stalks, in part resting on the stripper rolls 9 and in part projecting downwardly between the stripper rolls and the ejector rolls, are pulled downwardly and dropped upon the ground instead of being carried rearwardly by the stripper rolls 9. In this way, clogging of the boll discharging mechanism, to be described later, by accumulation of stalks is prevented. Moreover, the ejector rolls are operated at a surface speed of rotation approximately the same as the ground speed of the harvester so that the ejector rolls will also prevent the uprooting of a large percentage of the poorly rooted stalks.

The rolls 9 and 13 and the augers 11 may be driven by any suitable mechanism. As is well known, many harvesting mechanisms are driven from the ground wheels as they rotate during movement of the harvester over the ground. However, in the illustrated embodiment, the rolls 9 and 13 and the augers 11 are driven through a belt and pulley drive mechanism generally designated 14, which is operable by the tractor engine through suitable driving connections, not shown.

Mounted on the rear of the mechanism frame 5 is a blower housing 115 which forms part of an air flow passage 116 defined at its front, that is ahead of the housing 115, by an inclined top wall 117 and two side walls 118. The entrance end of the passage 116 is above the rear end portions of the stripping rolls 9 and conveyor augers 11, as indicated at 119 in FIGURE 1. The discharge end of the flow passage 116 is at the top of the blower housing 115, as indicated at 120, where the passage 116 opens into a discharge conduit 121.

Mounted for rotation in the blower housing 115 is a blower impeller 122 comprising vanes or paddles 123 extending radially outwardly from a shaft 124. The impeller shaft may be driven in any suitable manner, for example by a belt and pulley mechanism generally designated 125.

In operation, as the harvester proceeds down the plant rows, bolls stripped from the stalks and carried rearwardly by the augers 11 are picked up by the air stream flowing through the air flow passage 116, the bolls and trash entrained in the air stream entering through the entrance end 119 of the air flow passage 116 and passing through a flow opening 126 in a wall 127 between the impeller 122 and the forward part of the flow passage 116, and thence out of the top of the housing 115. The passage 116 leads to the blower in a direction generally normal to the plane of rotation of the impeller 122. In order to prevent bolls flowing directly towards the impeller from entering between the vanes 123, a screen 128 is fixed to the blower shaft 124 at the sides or edges of the vanes facing the air flow passage 116, the screen 128 being spaced sufficiently from the adjacent wall 127 of the housing 115 to provide clearance for the passage of the bolls upwardly between the wall and the screen without clogging the blower.

Despite the ejector rolls 13, which have been found to operate very effectively in practice, some stalk pieces of substantial length and other trash may reach the rear ends of the rolls 9 and 13 and augers 11, and be picked up in the air induction stream flowing through the passage 116 which opens at 119 immediately above the rear ends of the rolls and augers. Trash of this kind, especially fairly long pieces of stalks, unless properly dealt with, would have a tendency to clog the air flow passage 116 or the clearance between the screen 128 and the adjacent wall 127 of the housing 115. In order to obviate this difficulty, a trash breaker TB is mounted to span the flow passage 116 on the upstream side of the blower and to break up elongated pieces of trash, for example stalk portions, before they can pass through and out of the passage 116. Best results have been obtained by forming the trash breaker TB to include rods or wires 129 and 130 of spring metal, for example steel, and mounting the trash breaker on the blower shaft 124 to span the passage 116 transversely. Importantly, the breaker TB is positioned to span the air stream flowing from the point of pick up of bolls at a location up stream from the screen 128, that is between the screen and the conveyors 11. As so arranged and positioned, the breaker TB reduces any stalk sections picked up in the air stream into such small pieces that they may readily flow through the blower housing without jamming the screen 128 and without clogging the passage 116 or the clearance between the screen 128 and the adjacent blower housing wall 127. The breaker rods 129 and 130 being of spring metal, and being somewhat blunt, neither cut through cotton bolls nor abruptly stop nor sharply decelerate the blower shaft 124 upon striking an unusually large piece.

To the extent the trash breaker TB is described above, it is generally similar to the trash breaker disclosed in applications, Serial Nos. 126,203 and 248,651, the latter filed concurrently herewith. Important changes in the construction of the trash breaker TB disclosed in the present application have resulted in even more efficient operation, particularly in avoiding accumulation of trash between the breaker rods and the adjacent wall spanning the air flow passage, and in avoiding wrapping of trash, such as stalks, around the breaker shaft.

For preventing accumulation of trash between the breaker rods 129, 130 and the wall 127, the rods are so mounted on the shaft 124 as to sweep a continuously cylindrical area projecting on both sides of the opening 126 in the wall 127. In the construction shown, the rod 129 extends from the shaft 124 at a forward inclination so as to project in front of the portion of the wall 127 adjacent to the flow opening 126 and radially beyond the margin of the opening. Conversely, the rod 130 extends from the shaft 124 at a rearward inclination so as to project in rear of the portion of the wall 127 adjacent to the flow opening 126 and radially beyond the margin of the opening. Considering the two rods 129, 130 together, their central portions are both approximately within the flow opening 126, and their outer portions project respectively on opposite sides of the wall 127, that is at the inlet and outlet i.e. upstream and downstream sides of the flow opening. This construction has been found in extensive use to eliminate building up of accumulated trash adjacent to the flow opening 126.

Wrapping of stalk or like trash around the blower and breaker shaft has been prevented by providing the shaft with relatively rigid vanes or blades 131 of less radial extent than the arms or rods 129, 130, the vanes being elongated parallel to the axis of the shaft 124 and extending completely through the opening 126 and projecting beyond both the upstream and downstream sides of the wall 127. The blades terminate radially within the margin of the opening 126 and preferably the upstream ends of the vanes 131 are tapered at 131'. In operation, stalks or other stringy trash which otherwise would tend to wrap around the shaft 124 are struck by the vanes 131 with such impact as to be broken into pieces so short as not to be wrappable around the shaft 124. Consequently, the pieces are thrown out into the air stream and further broken by the arms or rods 129, 130.

Harvested cotton bolls are delivered from the blower housing 115 into the discharge conduit 121 which is curved upwardly and rearwardly for discharging cotton bolls, usually into a trailing cart, not shown, drawn by the tractor. Some small trash, for example stalks broken up by the breaker TB will flow upwardly through the discharge conduit 121 with the cotton bolls. In order to reduce the amount of small trash particles delivered into the trailing cart, the top wall of the upper end of the conduit 121 is cut away at 26, leaving only the conduit bottom and side walls at the discharge end. The cut away portion of the conduit 121 is spanned by an assembly of spaced fingers 27, preferably of spring metal, carried by a strap 27a pivoted at 27b to the conduit side walls. Preferably, the rear ends of the fingers 27 are turned or inclined upwardly as clearly shown in FIGURE 1. The arrangement is such that as both cotton bolls and small pieces of trash arrive at the top end of the conduit 121, the bolls, being very light and somewhat wider than the slots between the fingers 27, are guided by the finger assembly so as to be discharged rearwardly through a trajectory controlling deflector 28 pivoted at 29 on the conduit 121. Bolls striking the fingers 27, although at considerable speed, are so light as not to exert sufficient centrifugal force to force their way between the fingers. However, pieces of trash, being heavier than the bolls and travelling at the same speed, will exert greater centrifugal force, are therefore not so easily maintained in the intended direction of travel of the bolls, and will force their way between and beyond the fingers 27 so as not to be discharged with the bolls into the trailing cart.

Rocks, green bolls and relatively dense trash which may be carried to the rear of the conveyor troughs by the augers 11 may be sufficiently heavy so as not to be picked up by the induction air stream. In order to separate such foreign matter from the cotton bolls, each side of the mechanism housing B is formed at its rear end with a trash discharge opening 30 at the bottom of the conveyor trough. Heavy trash may drop through the opening 30 into a collection box 31 which may be emptied from time to time. The ejector rolls, being disposed quite close to one another, would tend to prevent trash from dropping to the opening 30 but for the fact that the ejector rolls are formed at their rear ends with portions 32 of reduced diameter, thus providing ample space for the dropping out of trash which may have been carried rearwardly above the rolls 13.

The suspension structure S, more fully described in application, Serial No. 126,203, is so coordinated with the main frame A and harvester units B that the latter may have side-to-side floating movement at their front ends, transversely of the direction of travel of the main frame A over the ground, and may be adjusted with facility to accommodate to different kinds of terrain or slopes. As shown in FIGURE 1, the power lift arm 4 is pivotally connected to a cross bar elevator structure 34 of inverted channel shape. Secured to the cross bar 34 is a pivot pin 35 from which depends a suspension structure 36 which supports a tube 40 connected to the rear end of the harvester unit B.

The front end of the unit B is supported from a segment 41 fixed to the main frame A, an adjusting lever 42 equipped with a pawl mechanism 43, a link 44 connected at 46 to a link 47, itself connected to an arm 49 fast with the power lift arm 4, and a link 50 connected at 46 to the links 44 and 47 and at 51 to a member 52 connected to the front part of the harvester unit B. The member 52 extends transversely between and connects the unit B and its companion unit, not shown but which is similar to the unit B. It is apparent that adjustment of the lever 42 and operation of the power lift arm 4 and its companion power lift arm, not shown, will adjust the two harvester units vertically. The suspension S comprising the links 44, 47 and 50, and the structure 36, supports the harvester units for floating movement.

It is apparent that cotton boll or like material delivering and trash breaking apparatus in accordance with the invention may be employed in environments or in connection with mechanisms other than those represented by the harvester mechanism described above by way of example.

The material delivering and trash breaking mechanism shown and described embodies the invention in a preferred form, but it is intended that the disclosure be illustrative rather than definitive, the invention being defined in the claims.

I claim:

1. In apparatus for delivering cotton bolls or like material which may have trash material mixed therewith, means providing an air flow passage having an entrance end and a discharge end; a blower for moving an air stream and entrained material through said passage; a wall spanning said passage transversely to the movement of the air stream therein and having an air stream and entrained material flow opening; and a trash breaker mounted to rotate about an axis extending through said flow opening and having a central portion within said flow opening and outer portions respectively at the inlet and outlet sides of said flow opening, said outer portions extending over the portions of said wall adjacent to said flow opening at opposite sides of said wall.

2. In apparatus for delivering cotton bolls or like material which may have trash material mixed therewith, means providing an air flow passage having an entrance end and a discharge end; a blower for moving an air stream and entrained material through said passage; a wall spanning said passage transversely to the movement of the air stream therein and having an air stream and entrained material flow opening; and a trash breaker mounted to rotate about an axis extending through said flow opening and comprising a shaft and two radiating arms carried by said shaft and being inclined to said axis and respectively extending from within said flow opening, one upstream and the other downstream of the air flow, and respectively projecting over portions of said wall adjacent to said opening upstream and downstream of said wall.

3. Apparatus according to claim 2 in which said radiating arms are constituted by springy material.

4. Apparatus according to claim 2 in which said radiating arms are constituted by rods.

5. Apparatus according to claim 2 in which said radiating arms are blunt.

6. Apparatus according to claim 2 in which said radiating arms are constituted by springy blunt metallic rods.

7. In apparatus for delivering cotton bolls or like material which may have trash material mixed therewith, means providing an air flow passage having an entrance end and a discharge end; a blower for moving an air stream and entrained material through said passage; a wall spanning said passage transversely to the movement of the air stream therein and having an air stream and entrained material flow opening; and a trash breaker mounted to rotate about an axis extending through said flow opening and comprising a shaft, two radiating arms carried by said shaft and being inclined to said axis and respectively extending from within said flow opening, one upstream and the other downstream of the air flow, and respectively projecting over portions of said wall adjacent to said opening upstream and downstream of said wall, and blade means carried by said shaft, projecting outwardly therefrom, terminating radially within the margin of said flow opening, and being elongated parallel to said axis to extend beyond said wall both upstream and downstream of the latter.

8. Apparatus according to claim 7 in which said radiating arms comprise springy material.

9. Apparatus according to claim 8 in which said blade means are relatively rigid as compared to said radiating arms.

10. In apparatus for delivering cotton bolls or like material which may have trash material mixed therewith, means providing an air flow passage having an entrance end and a discharge end; a blower in said air flow passage for moving an airstream and entrained material through said passage; a screen in said passage adjacent to and on the upstream side of said blower; a wall upstream of and spaced from said screen and spanning said passage transversely to the movement of the air stream therein and having an air stream and entrained material flow opening; and a trash breaker mounted to rotate about an axis extending through said flow opening and having a central portion within said flow opening and outer portions respectively at the inlet and outlet sides of said flow opening, said outer portions extending over the portions of said wall adjacent to said flow opening at opposite sides of said wall.

References Cited by the Examiner
UNITED STATES PATENTS

| | | | |
|---|---|---|---|
| 2,571,224 | 10/51 | Edwards | 56—14 |
| 2,673,438 | 3/54 | Miller et al. | 56—33 X |
| 2,707,364 | 5/55 | Wagnon | 56—30 |

SAMUEL F. COLEMAN, *Primary Examiner.*

RUSSEL R. KINSEY, *Examiner.*